(12) United States Patent
Sedarat

(10) Patent No.: US 9,912,375 B1
(45) Date of Patent: Mar. 6, 2018

(54) CANCELLATION OF ALIEN INTERFERENCE IN COMMUNICATION SYSTEMS

(75) Inventor: Hossein Sedarat, San Jose, CA (US)

(73) Assignee: Aquantia Corp., Milpitas, CA (US)

( * ) Notice: Subject to any disclaimer, the term of this patent is extended or adjusted under 35 U.S.C. 154(b) by 30 days.

(21) Appl. No.: 12/563,938

(22) Filed: Sep. 21, 2009

Related U.S. Application Data

(63) Continuation of application No. 12/551,396, filed on Aug. 31, 2009, now abandoned.

(60) Provisional application No. 61/099,979, filed on Sep. 25, 2008, provisional application No. 61/141,640, filed on Dec. 30, 2008, provisional application No. 61/141,639, filed on Dec. 30, 2008, provisional application No. 61/173,394, filed on Apr. 28, 2009.

(51) Int. Cl.
*H04B 3/32* (2006.01)
*H04B 3/30* (2006.01)
*H04L 27/26* (2006.01)

(52) U.S. Cl.
CPC ............... *H04B 3/32* (2013.01); *H04B 3/30* (2013.01); *H04L 27/2647* (2013.01)

(58) Field of Classification Search
CPC .......... H04B 3/32; H04B 3/30; H04L 27/2647
USPC ................... 455/296; 375/346, 258, 285, 242
See application file for complete search history.

(56) References Cited

U.S. PATENT DOCUMENTS

| | | | |
|---|---|---|---|
| 3,506,906 A | 4/1970 | Nestor | |
| 3,671,859 A | 6/1972 | Miller | |
| 4,797,902 A | 1/1989 | Nishiguchi et al. | |
| 4,870,370 A | 9/1989 | Hedberg et al. | |
| 5,157,690 A | 10/1992 | Buttle | |
| 5,283,811 A | 2/1994 | Chennakeshu et al. | |
| 5,550,924 A | 8/1996 | Helf et al. | |
| 5,777,692 A | 7/1998 | Ghosh | |
| 5,832,032 A * | 11/1998 | Overbury | 375/285 |
| 5,889,511 A | 3/1999 | Ong et al. | |
| 5,910,960 A | 6/1999 | Claydon et al. | |
| 5,995,566 A * | 11/1999 | Rickard et al. | 375/346 |
| 5,995,567 A * | 11/1999 | Cioffi et al. | 375/346 |
| 6,011,508 A | 1/2000 | Perreault et al. | |
| 6,035,360 A | 3/2000 | Doidge et al. | |
| 6,069,917 A | 5/2000 | Werner et al. | |
| 6,285,718 B1 | 9/2001 | Reuven | |
| 6,385,315 B1 * | 5/2002 | Viadella et al. | 379/88.23 |
| 6,424,234 B1 | 7/2002 | Stevenson | |

(Continued)

FOREIGN PATENT DOCUMENTS

| | | |
|---|---|---|
| WO | WO 97/40587 | 10/1997 |
| WO | WO2011/056970 A2 | 5/2011 |

OTHER PUBLICATIONS

U.S. Appl. No. 12/604,323, filed Oct. 22, 2009, Sedarat et al.

(Continued)

*Primary Examiner* — Lewis West
(74) *Attorney, Agent, or Firm* — Lance Kreisman; Peninsula Patent Group

(57) ABSTRACT

Cancellation of alien interference in signals transmitted over communication channels. In one aspect, one or more signals are received at a receiver from a communication link, an alien interference in the received signals is determined based on at least one of the received signals, one or more canceling signals is determined based on the alien interference, and the canceling signals are used to reduce the alien interference in the one or more received signals.

18 Claims, 5 Drawing Sheets

(56) References Cited

U.S. PATENT DOCUMENTS

| | | | |
|---|---|---|---|
| 6,486,746 B1 | 11/2002 | Gilbert | |
| 6,683,913 B1 | 1/2004 | Kantschuk | |
| 6,690,739 B1 | 2/2004 | Mui | |
| 6,711,207 B1 | 3/2004 | Amrany et al. | |
| 6,734,659 B1 | 5/2004 | Fortner | |
| 6,771,720 B1 | 8/2004 | Yang et al. | |
| 6,924,724 B2 | 8/2005 | Grilo et al. | |
| 6,934,345 B2 | 8/2005 | Chu et al. | |
| 6,959,056 B2 * | 10/2005 | Yeap et al. | 375/346 |
| 6,999,504 B1 | 2/2006 | Amrany et al. | |
| 7,026,730 B1 | 4/2006 | Marshall et al. | |
| 7,031,402 B2 | 4/2006 | Takada | |
| 7,103,013 B1 | 9/2006 | Kim et al. | |
| 7,123,117 B2 | 10/2006 | Chen et al. | |
| 7,164,764 B2 | 1/2007 | Zimmerman et al. | |
| 7,173,992 B2 | 2/2007 | Frigon | |
| 7,180,940 B2 | 2/2007 | Li et al. | |
| 7,200,180 B2 | 4/2007 | Verbin et al. | |
| 7,315,592 B2 * | 1/2008 | Tsatsanis et al. | 375/346 |
| 7,333,603 B1 | 2/2008 | Sallaway et al. | |
| RE40,149 E | 3/2008 | Vitenberg | |
| 7,440,892 B2 | 10/2008 | Tamura | |
| 7,457,386 B1 | 11/2008 | Phanse | |
| 7,459,982 B2 | 12/2008 | Miao | |
| 7,492,840 B2 * | 2/2009 | Chan | 375/346 |
| 7,522,928 B2 | 4/2009 | O'Mahony | |
| 7,542,528 B1 | 6/2009 | Cheong | |
| 7,634,032 B2 | 12/2009 | Chu et al. | |
| 7,656,956 B2 | 2/2010 | King | |
| 7,706,434 B1 | 4/2010 | Farjadrad | |
| 7,708,595 B2 | 5/2010 | Chow et al. | |
| 8,094,546 B2 | 1/2012 | Schenk | |
| 8,139,602 B2 * | 3/2012 | Meier | 370/463 |
| 8,331,508 B2 | 12/2012 | Dabiri | |
| 8,472,532 B2 | 6/2013 | Schley-May et al. | |
| 8,625,704 B1 | 1/2014 | Sedarat et al. | |
| 2003/0186591 A1 * | 10/2003 | Jensen et al. | 439/676 |
| 2003/0223488 A1 | 12/2003 | Li et al. | |
| 2003/0223505 A1 | 12/2003 | Verbin et al. | |
| 2004/0010203 A1 | 1/2004 | Bibian et al. | |
| 2004/0023631 A1 * | 2/2004 | Deutsch et al. | 455/283 |
| 2004/0164619 A1 | 8/2004 | Parker et al. | |
| 2004/0213366 A1 | 10/2004 | Ono | |
| 2004/0239465 A1 | 12/2004 | Chen et al. | |
| 2004/0252755 A1 | 12/2004 | Jaffe et al. | |
| 2004/0257743 A1 | 12/2004 | Chen et al. | |
| 2005/0018777 A1 | 1/2005 | Azadet | |
| 2005/0025266 A1 * | 2/2005 | Chan | 375/346 |
| 2005/0053229 A1 | 3/2005 | Tsatsanis et al. | |
| 2005/0097218 A1 | 5/2005 | Sultenfuss et al. | |
| 2005/0123081 A1 | 6/2005 | Shirani | |
| 2005/0135489 A1 | 6/2005 | Ho et al. | |
| 2005/0203744 A1 | 9/2005 | Tamura | |
| 2005/0243483 A1 | 11/2005 | Chen et al. | |
| 2006/0018388 A1 | 1/2006 | Chan | |
| 2006/0056503 A1 | 3/2006 | Keshab et al. | |
| 2006/0159186 A1 | 7/2006 | King | |
| 2006/0182014 A1 | 8/2006 | Lusky et al. | |
| 2006/0256880 A1 | 11/2006 | Frisch | |
| 2007/0014378 A1 | 1/2007 | Parhi et al. | |
| 2007/0081475 A1 | 4/2007 | Telado et al. | |
| 2007/0146011 A1 | 6/2007 | O'Mahony et al. | |
| 2007/0192505 A1 | 8/2007 | Dalmia | |
| 2007/0258517 A1 | 11/2007 | Rollings et al. | |
| 2007/0280388 A1 | 12/2007 | Torre et al. | |
| 2008/0089433 A1 | 4/2008 | Cho et al. | |
| 2008/0095283 A1 | 4/2008 | Shoor et al. | |
| 2008/0107167 A1 | 5/2008 | Tung et al. | |
| 2008/0160915 A1 | 7/2008 | Sommer et al. | |
| 2008/0198909 A1 | 8/2008 | Tsatsanis et al. | |
| 2008/0267212 A1 | 10/2008 | Crawley et al. | |
| 2009/0061808 A1 | 3/2009 | Higgins | |
| 2009/0097401 A1 | 4/2009 | Diab | |
| 2009/0097539 A1 | 4/2009 | Furman et al. | |
| 2009/0154455 A1 | 6/2009 | Diab | |
| 2009/0161781 A1 | 6/2009 | Kolze | |
| 2010/0046543 A1 | 2/2010 | Parnaby | |
| 2010/0073072 A1 | 3/2010 | Ullen et al. | |
| 2010/0074310 A1 | 3/2010 | Roo et al. | |
| 2010/0086019 A1 | 4/2010 | Agazzi et al. | |
| 2010/0111202 A1 * | 5/2010 | Schley-May et al. | 375/258 |
| 2010/0159866 A1 | 6/2010 | Fudge et al. | |
| 2011/0212692 A1 | 1/2011 | Hahn | |
| 2011/0032048 A1 | 2/2011 | Wu et al. | |
| 2011/0069794 A1 | 3/2011 | Tavassoli Kilani et al. | |
| 2011/0106459 A1 | 5/2011 | Chris et al. | |
| 2011/0256857 A1 | 10/2011 | Chen et al. | |
| 2011/0293041 A1 | 12/2011 | Luo et al. | |
| 2011/0296267 A1 | 12/2011 | Malkin et al. | |

OTHER PUBLICATIONS

U.S. Appl. No. 12/604,323, filed Oct. 22, 2009, Farjadrad et al.
U.S. Appl. No. 12/604,351, filed Oct. 22, 2009, Sedarat et al.
U.S. Appl. No. 12/604,358, filed Oct. 22, 2009, Sedarat et al.
U.S. Appl. No. 12/977,844, filed Dec. 23, 2010, Sedarat.

* cited by examiner

CANCELLATION OF ALIEN INTERFERENCE IN COMMUNICATION SYSTEMS

CROSS REFERENCE TO RELATED APPLICATIONS

This application is a continuation of U.S. patent application Ser. No. 12/551,396, filed Aug. 31, 2009;

This application also claims benefit of:

U.S. Provisional Application No. 61/099,979, filed Sep. 25, 2008, entitled, "Interference Cancellation in 10GBASE-T and Other Multi Channel Communication Systems,"

U.S. Provisional Application No. 61/141,640, filed Dec. 30, 2008, entitled, "Methods and Apparatus to Detect Common Mode Signal in Wireline Communication Systems,"

U.S. Provisional Application No. 61/141,639, filed Dec. 30, 2008, entitled, "Methods and Apparatus to Detect Common Mode Signal in Wireline Communication Systems,"

U.S. Provisional Application No. 61/173,394, filed Apr. 28, 2009, entitled, "Integrated Common-Mode Transformer for Detection of Electromagnetic Interference on the Channel,"

all of which are incorporated herein by reference in their entireties.

This application is related to:

U.S. patent application Ser. No. 12/604,351, entitled, "Rejecting RF Interference in Communication Systems," filed Oct. 22, 2009 and assigned to the assignee of the present invention;

U.S. patent application Ser. No. 12/604,323, entitled, "A Common Mode Detector for a Communication System," filed Oct. 22, 2009 and assigned to the assignee of the present invention;

U.S. patent application Ser. No. 12/604,358, entitled, "Fast Retraining for Transceivers in Communication Systems," filed Oct. 22, 2009 and assigned to the assignee of the present invention;

U.S. patent application Ser. No. 12/604,343, entitled, "A Magnetic Package for a Communication System," filed Oct. 22, 2009 and assigned to the assignee of the present invention;

U.S. patent application Ser. No. 12/551,210, entitled, "Rejecting RF Interference in Communication Systems," filed Aug. 31, 2009 and assigned to the assignee of the present invention;

U.S. Provisional Application No. 61/153,440, filed Feb. 18, 2009, entitled, "Methods of Rejecting RF Interference in 10GBase-T Communication Systems";

U.S. patent application Ser. No. 12/551,340, entitled, "A Common Mode Detector for a Communication System," filed Aug. 31, 2009 and assigned to the assignee of the present invention;

U.S. patent application Ser. No. 12/551,347, entitled, "Fast Retraining for Transceivers in Communication Systems," filed Aug. 31, 2009 and assigned to the assignee of the present invention;

U.S. Provisional Application No. 61/148,112, filed Jan. 29, 2009, entitled, "Fast Retrain to In Decision-Directed Communication Systems";

U.S. patent application Ser. No. 12/551,326, entitled, "A Magnetic Package for a Communication System," filed Aug. 31, 2009 and assigned to the assignee of the present invention;

all of which are incorporated herein by reference in their entireties.

FIELD OF THE INVENTION

The present invention relates generally to electronic communications, and more particularly to cancellation of alien interference in signals transmitted over communication channels.

BACKGROUND OF THE INVENTION

Communication systems are widely used in computer and device networks to communicate information between computers and other electronic devices. Transceivers of a communication system send and receive data over a link (including one or more channels) of a communication network to communicate with other transceivers. A transceiver includes a transmitter for sending information across a link, and a receiver for receiving information from a link. The receiver detects transmitted data on the link and converts the data into a form usable by the system connected to the transceiver. For example, one widely-used network communication standard is Ethernet, including several different standards for different network bandwidths, including 10GBASE-T allowing 10 gigabit/second connections over unshielded or shielded twisted pair cables.

The IEEE 802.3an standard specifies 4 pairs of unshielded twisted copper as the communication channel in 10GBASE-T Ethernet systems. Each transceiver consists of 4 channels, each transmitting on one pair and also receiving on the same pair simultaneously. This scheme is similar to what is used in the older generation of Ethernet over copper. However, since the signal bandwidth in 10GBASE-T is much wider than the older generations, the standard recommends a better quality of cabling which offers lower insertion loss and lower crosstalk.

There are multiple sources of impairment and interference in a 10GBASE-T system which can cause significant performance degradation. These sources of impairment and interference can be broadly categorized as internal and external sources. The internal sources are caused by the link-partners themselves and imperfect channel characteristics. Examples of these sources are inter-symbol interference (ISI), echo and pair-to-pair cross-talk such as far-end cross-talk (FEXT) and near-end crosstalk (NEXT). Such noise sources are known to the link partners and thus can be cancelled effectively with cancellers and equalizers. These sources are very well characterized not only in the 10GBASE-T standard but also in the standards for older generations of Ethernet over copper. There are also well-known solutions to cancel, reject or mitigate the effects of these impairments in these standards. The signal source that causes these types of noise is known to the subject link or port experiencing the noise, and so this type of noise can be readily cancelled in that link.

Another type of impairment in 10GBASE-T systems is interference from sources external to a particular link. Examples of external interfering sources, referred to herein as alien interferers, include adjacent cross-talking Ethernet ports/links, where the noise source is from a different port or cable that is adjacent to the subject link (port) and thus the source of the interference is unknown to the subject link, and is a greater challenge to reduce than noise originating from a known source such as ISI, echo, FEXT, and NEXT. Alien interference also can include RF interference (RFI), which is produced from external unknown sources including RF interferers such as mobile phones, walkie-talkies, etc. These interferers are particularly harmful in 10GBASE-T technology because of its wide signaling bandwidth. The effects of these interference sources and methods to mitigate those effects are not widely understood, and are not well addressed or supported in existing standards. For example, the 10GBASE-T standard allows for the reduction in alien crosstalk only through a power backoff mechanism, in which signal power is reduced to reduce crosstalk if the link cable length is short enough to permit such a power reduction. However, this mechanism is not adaptable to any particular alien interference, and thus, for example, does nothing to address alien crosstalk that exists for greater signal power over long cable lengths or at backed-off power levels, nor alien interference from other sources. Consequently, alien interference sources can present difficulties for the desired performance of high bandwidth communication systems.

Accordingly, what is needed are systems and methods that reduce or cancel alien interference in channels of communication systems, providing more robust communication in such systems.

SUMMARY OF THE INVENTION

Methods and apparatus for canceling alien interference in a communication network are disclosed. In one aspect, a method for canceling alien interference in a communication system includes receiving one or more signals at a receiver from a communication link, determining an alien interference in the one or more received signals based on at least one of the received signals, determining one or more canceling signals based on the alien interference, and using the one or more canceling signals to reduce the alien interference in the one or more received signals. In another aspect, an alien interference in the data signals is determined by tapping a transformer provided on one of the channels of the received data signals.

In another aspect, a receiver performing cancellation of alien interference in a communication system, and includes at least one receiver block for receiving one or more signals at a receiver on corresponding channels of a communication link. Also included is a source of interference that provides an alien interference signal indicating an alien interference on the one or more signals, and an alien interference canceller that receives the alien interference signal and determines and outputs one or more canceling signals based on the alien interference signal. One or more adders, coupled to the canceller and to the channels of the received signals, uses the one or more canceling signals to reduce the alien interference in the one or more received signals.

The inventions disclosed herein allow alien interference to be reduced in channels of a communication system. Various types of alien interference, including alien crosstalk and radio frequency interference, can be reduced using the inventions, allowing more accurate and robust communication of signals.

DETAILED DESCRIPTION OF PREFERRED EMBODIMENTS

The present invention relates generally to electronic communications, and more particularly to cancellation of alien interference in signals transmitted over communication channels. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention describes systems and methods for canceling the effect (or part of the effect) of external-source alien interferers in a multi-channel communication system, such as 10GBASE-T Ethernet. The inventions are described in the context of a 10GBASE-T communication system but are equally applicable to many other communication standards and systems. Furthermore, the present inventions are suitable for multi-channel communication systems but also may be employed in other types of communication systems.

Figure 1:
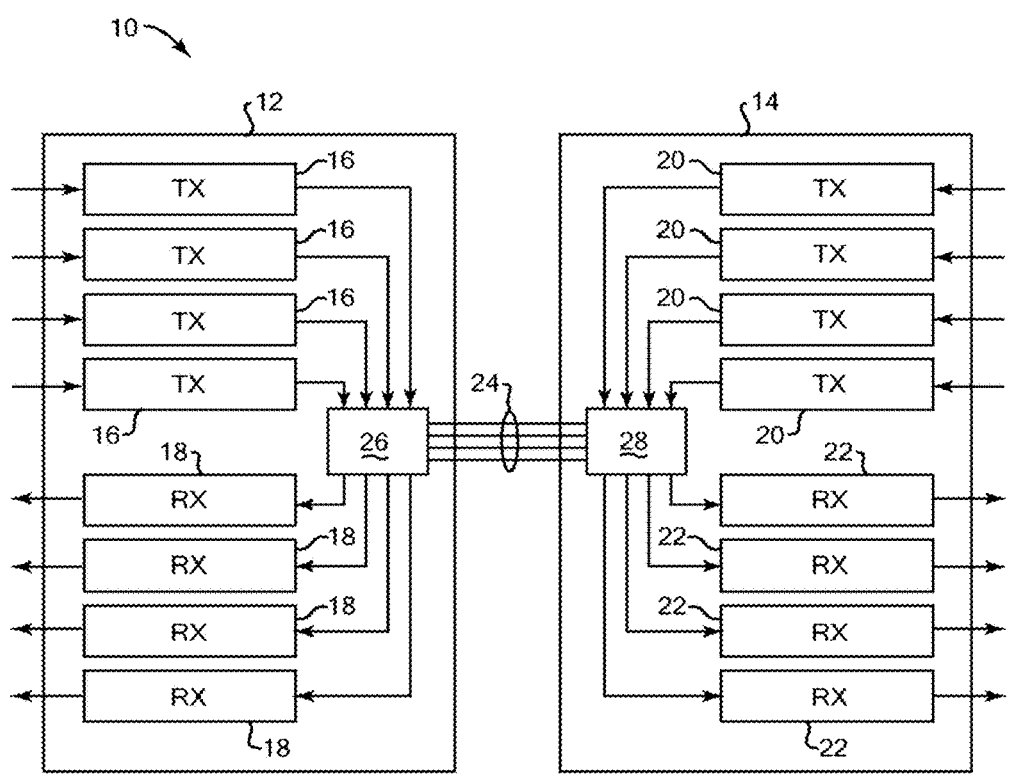
FIG. 1 is a block diagram illustrating a communication system suitable for use with the present invention.

FIG. 1 is a block diagram illustrating an example communication system 10 suitable for use with the present invention. System 10 includes a first transceiver 12 and a second transceiver 14 which can communicate with each other. Transceiver 12 includes "transceiver components" including one or more transmitters 16 and one or more receivers 18. Similarly, transceiver 14 includes transceiver components including one or more transmitters 20 and one or more receivers 22. The transmitters 16 (and 20) shown in FIG. 1 can be considered individual "transmitters," as typically referenced herein, or can be considered individual transmitter channels which a transmitter block within the transceiver can independently transmit signals on. Similarly, receivers 18 (and 22) can be considered individual "receivers," as typically referenced herein, or can alternately be considered individual receiver channels which a receiver block within the transceiver can independently receive signals on. The transmitters 16 and 20 and receivers 18 and 22 are connected to one or more components (not shown) of a computer system, device, processor, or other "controller" associated with each respective transceiver which want to communicate data over the communication network. For example, transmitters 16 receive data and control signals from the controller connected to transceiver 12 in order to send the data over the network to other transceivers and controllers, while receivers 18 receive data from other transceivers and controllers via the network in order to provide the data to the controller connected to first transceiver 12.

The transceiver 12 can communicate with the transceiver 14 over one or more communication channels of a communication link 24. For example, for the 10GBASE-T Ethernet standard, four communication channels are provided on link 24, each channel including a twisted pair cable. Thus, in that standard, there are four transmitters 16 and four corresponding receivers 18 provided in each of the transceivers 12 and 14, each transmitter associated with one of the local near-end receivers in the same transceiver, and each such transmitter/receiver pair dedicated to one channel used for duplex communication. A transmitter/receiver pair in one transceiver 12 communicates across a channel of link 24 to a far-end transmitter/receiver pair in transceiver 14. A transmitter 16 and a receiver 22 that are connected to the same channel/link, or two transceivers connected by the communication link 24, are considered "link partners."

An interface 26 can be provided in transceiver 12 and an interface 28 can be provided in transceiver 14 to allow data transmissions between the transceivers to be routed to the appropriate transceiver blocks. For example, interfaces 26 and 28 can include transformers to provide an open circuit inductance, and circuitry used for directing signals or data (alternatively, some or all circuitry can be included in other components, such as transmitters 16 and receivers 18).

In one example from the point of view of transceiver 12, data transmissions during normal operation from a local transmitter 16 are provided to the interface 26, which outputs the data on a corresponding channel of the communication link 24. The data is received by the link partner, the transceiver 14. The interface 28 of transceiver 14 provides the received data to its receiver 22 connected to that same channel. Furthermore, due to noise effects such as near-end crosstalk and echo, the data transmitted by transmitters 16 is also received by the near-end receivers 18 in the same transceiver. Filters can be used to filter out this noise so that the receivers 18 receive only data from other transceivers 14. In some embodiments, the transceivers 12 and 14 are asymmetric, such that data transmitted by a local transmitter has no dependence or relation with data being received by the corresponding local receiver.

Figure 2:
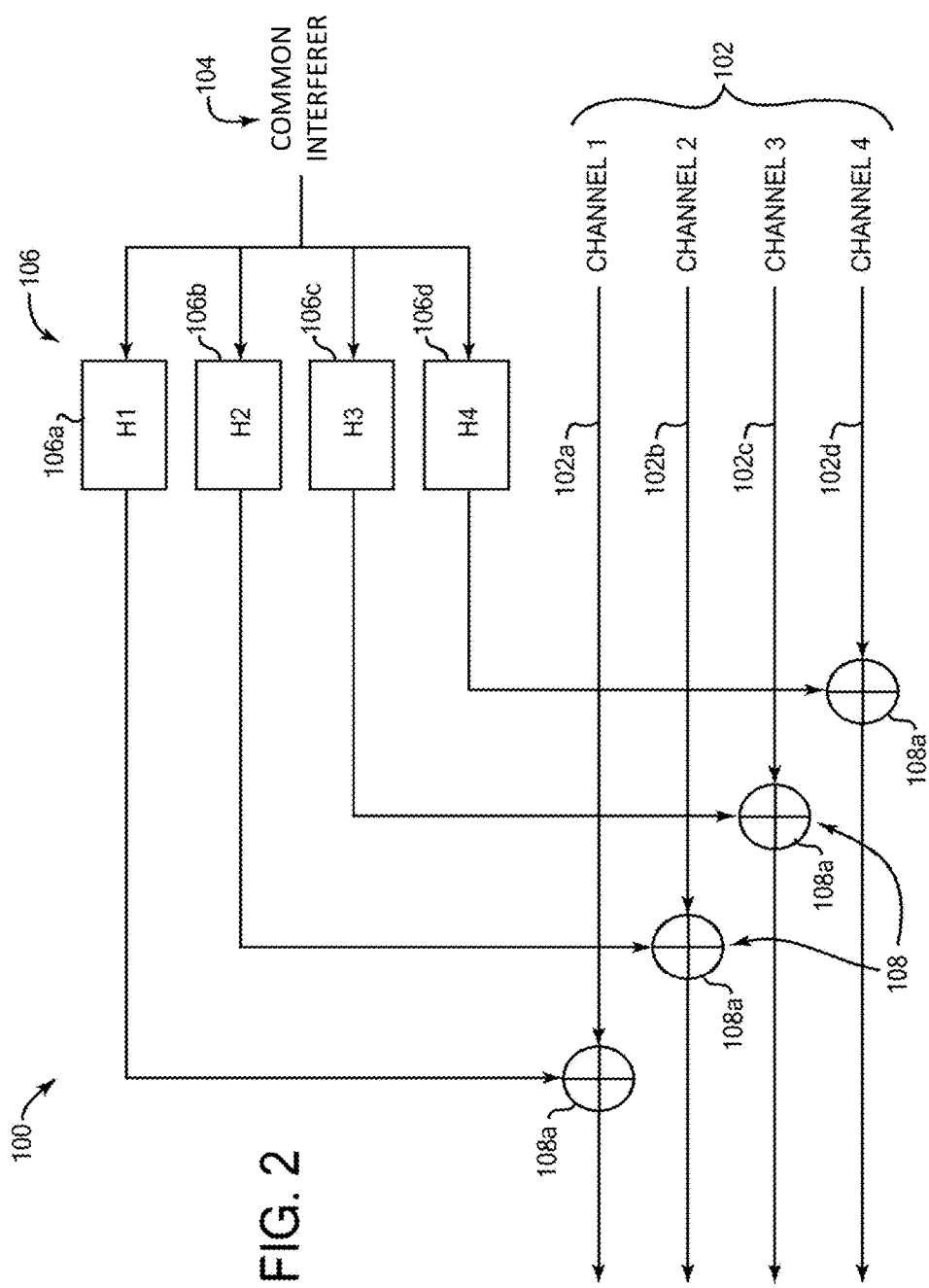
FIG. 2 is a schematic diagram illustrating one embodiment of an adaptive canceling system of the present invention for canceling or reducing alien interference.

FIG. 2 is a schematic diagram illustrating one embodiment of an adaptive canceling system 100 of the present invention for canceling alien interference. Herein, the term "cancel" for alien interference is intended to include cancellation of part of the total alien interference present, i.e. reduction of the total alien interference, or can include complete cancellation of all substantial alien interference. System 100 can be implemented in a receiver of a transceiver, such as in transceiver 12 and 14.

Communication data channels 102 are provided in the communication link to transmit and receive data from the link partners of the communication network. The example of FIG. 2 shows four communication data channels 102a, 102b, 102c, and 102d, as used in the 10GBASE-T standard. Other numbers of data channels can be used in other embodiments and according to other standards. At the right of the Figure, the data channels 102 can be connected to the communication link, e.g. connected to an analog front end, a hybrid, and/or a transformer provided at the transceiver which provides signals on the link and receives signals from the link. Some receiver components may also be connected to the channels 102 at the right of FIG. 2. At the left of FIG. 2, the channels 102 are connected to appropriate components in the receiver further down the receiver data paths. An example of the position of the adaptive canceling system 100 with respect to other receiver components is described below with respect to FIG. 4. In other embodiments, the components can be positioned in other locations relative to the system 100.

A common mode interferer 104 provides alien interference on the communication data channels. The embodiment 100 provides interference cancellation through adaptive filtering and assumes that the common noise source 104 is available. The interferer 104 can be any common mode noise source that is known to provide alien interference in the communication system. For example, the common mode interferer may be an adjacent port that transmits signals causing alien crosstalk on the subject channels. Or the common mode interferer may be a radio frequency source such as walkie-talkies, radio, television, etc. For purposes of explanation, the system 100 assumes that the common mode interferer, or the resulting alien interference from the common mode interferer, is known. Techniques for determining the alien interference from the common mode interferer 104 are discussed in greater detail below.

The present invention provides an adaptive filter 106 for each communication channel used in the link or communication system. Alien interference is a common mode noise that is highly correlated across all available communication channels. If the common noise source 104 or the resulting alien interference is accessible, the effect of the interference can be cancelled through a mechanism similar to cross-talk cancellation. Namely, individual adaptive filters 106 can be used to filter the noise and cancel its effect in each channel.

As shown, adaptive filters 106a, 106b, 106c, and 106d are connected to the common interferer 104 (or otherwise receive a resulting alien interference signal) and are each connected to an input of a corresponding adder 108a, 108b, 108c, or 108d. The other input of the adders 108 are the data channels 102 of the link, where channel 1 (102a) is input to adder 108a, channel 2 (102b) is input to adder 108b, channel 3 (102c) is input to adder 108c, and channel 4 (102d) is input to adder 108d. The outputs of the adders 108 are the continuation of the data channels 102, such as to other components of the receiver of the transceiver. Other embodiments can use different numbers of data channels and corresponding adders 108 and adaptive filters 106.

Each adaptive filter 106 can provide a cancellation of the interference from the source 104 similarly to cross-talk cancellation, such as Far End Crosstalk (FEXT) cancellation. For example, finite impulse response (FIR) filters can be included in filters 106 to perform the alien interference cancellation. For example, in some embodiments the interference cancellation using FIR filters can be performed fully in the digital domain, where the calculated digital value of interference by each adaptive filter 106 is subtracted at the corresponding adder 108 from the corresponding incoming noisy data input on the corresponding channel 102 (which can be previously digitized by an analog to digital converter (ADC), for example) to provide a resulting signal having the interference cancelled.

Figure 3:
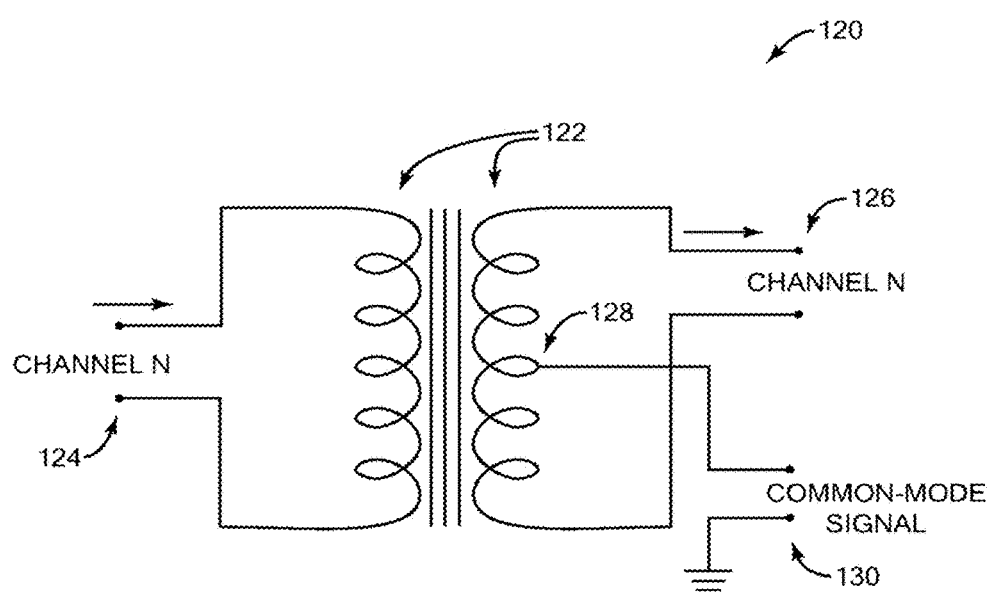
FIG. 3 is a schematic diagram illustrating embodiments of an apparatus to provide a common mode noise source in a communication system to allow alien interference caused by such a noise source to be determined.

FIG. 3 is a schematic diagram illustrating an embodiment of an apparatus 120 to provide a common mode noise source in a communication system to allow alien interference caused by such a noise source to be determined. In these embodiments, the common mode noise is directly measured from a transmission channel.

In the described embodiments of FIG. 3, an additional receiver path is provided to pick up the common mode noise signal on a receive data channel, where the additional receiver path is referred to herein as an "interference path." Common mode noise is noise that is referenced to a ground and that is present on both lines of a differential pair channel. Alien interference such as alien crosstalk and RFI will appear as common mode noise on the data channels. For example, RFI will affect both signals of a twisted pair equally and in the same way, which translates to a common mode noise signal.

An ideal receiver in a transceiver can pick up only the differential signal, or difference between the two lines, and is not influenced by any common voltage between the lines. However, for real, non-ideal receivers, a portion of the common mode voltage may translate to a portion of the differential signal which the receiver picks up, causing alien interference to be present in the received data signal. Previous receivers thus did not desire to directly detect any common mode signals. In the present invention, however, it is desired for the receiver to intentionally read the common mode voltage so that the alien interference source can be determined and alien interference cancelled.

The embodiment of FIG. 3 detects the common mode voltage from a link transformer. In many embodiments of twisted-pair link communication systems, a coupling transformer 122 is provided at the connection point of a transceiver for each communication channel in the link. Typically, an isolation transformer is provided at both a transmitter end of each channel and at a receiver end of each channel (here, the receiver end is shown), to provide, for example, DC isolation, common mode rejection, impedance matching between dedicated drivers of the transmitter and the impedance of the cable, and balanced data transfer over the cable of the channel.

The interference path is in addition to any existing receiver paths used for data communication. For example, in a 10GBASE-T system, four receiver paths are used for data communication, one connected to each channel. Channel N is used for tapping the common mode noise signal as shown in FIG. 3, and can be any one of the existing communication channels. The interference path is a fifth receiver path used to receive and process the common mode noise signal and determine alien interference. In the described embodiment, the communication channel N is connected to the transformer in the usual way. Thus, as shown in FIG. 3, the communication link is connected to the channel N differential terminals 124, which are connected to an input at one side of the transformer. The channel N differential terminals 126 are connected to a corresponding output at other side of the transformer 122. The differential channel N terminals 126 are also connected to the standard receiver components to which the usual differential channels are connected, such as components of an analog front end as described below in the embodiment of FIG. 4.

As shown in FIG. 3, the common mode noise signal from channel N can be picked up from an interference tap, which in the described embodiment is a center tap 128 of the coupling transformer 122. The common mode noise signal is provided on terminals 130, one terminal connected to the center tap 124 and the other terminal connected to ground. This common mode noise signal can act as the alien interference from the common mode interferer 104 shown in FIG. 2. Thus, the received common mode noise signal on terminals 130 can be provided to adaptive filters 106 and the alien interference subtracted (cancelled) from each of the regular communication channels 102, as shown in FIG. 2. The transformer 22 and its center tap 128 pick up the alien interference signal for use with the adaptive filters of the canceling system 100 shown in FIG. 2.

Example implementations of sensing or measuring a common mode voltage from a transformer are described in U.S. provisional patent applications 61/141,640, 61/141,639, and 61/173,394, and in copending U.S. patent application Ser. No. 12/551,340, filed concurrently herewith and entitled "A Common Mode Detector for a Communication System," and U.S. patent application Ser. No. 12/551,326, filed concurrently herewith and entitled "A Magnetic Package for a Communication System," all of which are incorporated herein by reference in their entireties. Any or all of the implementations described in these applications can be used in the present invention to provide a common mode voltage from the transformer.

Figure 4:
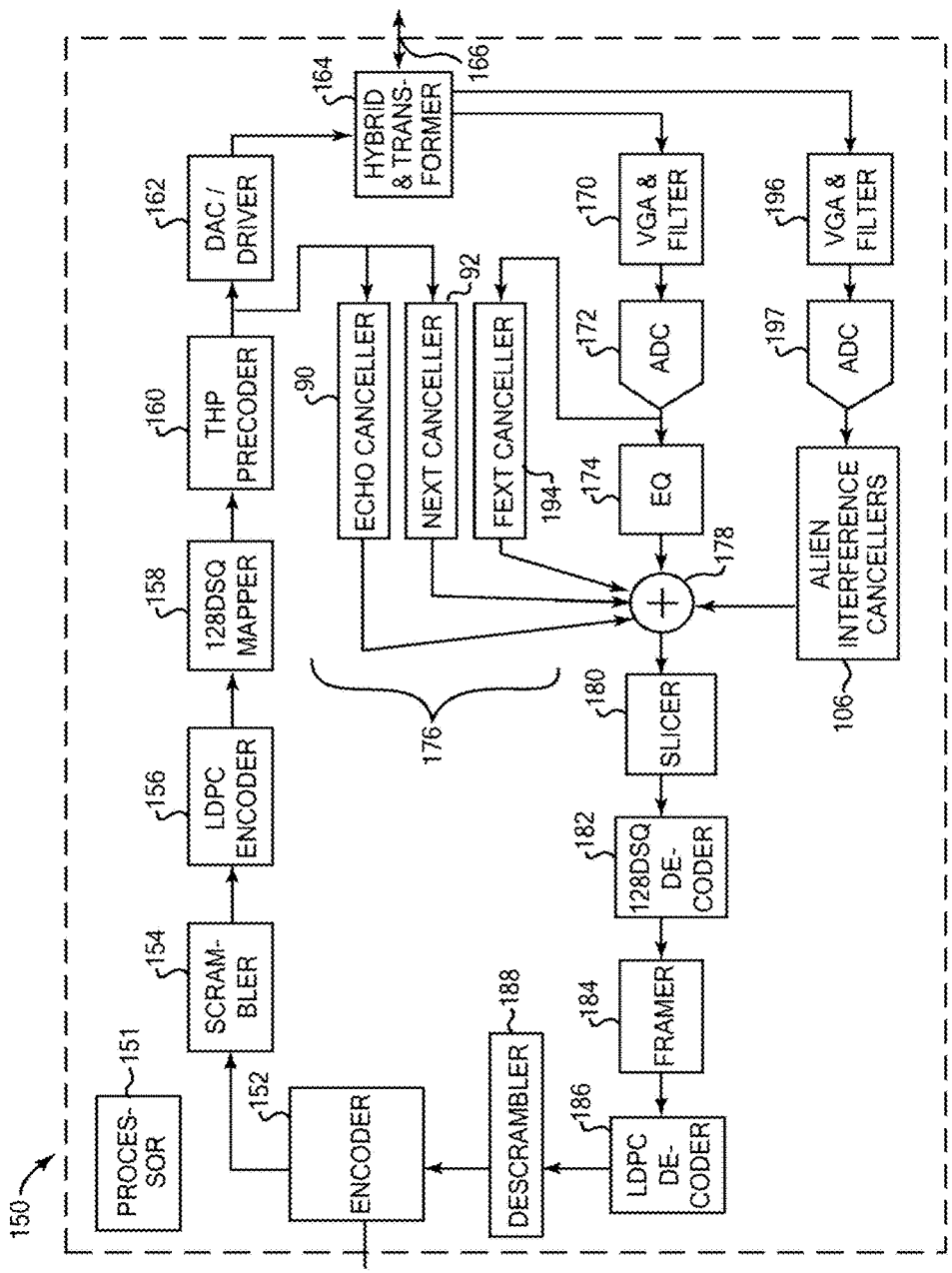
FIG. 4 is a block diagram illustrating one example of a transceiver suitable for use with an embodiment of the present invention using a fifth receiver path for common mode noise detection.

FIG. 4 is a block diagram illustrating one example of a transceiver 150 suitable for use with an embodiment of the present invention using a fifth receiver path (an interference path) for common mode noise detection. This example is suitable for a 10GBASE-T standard, but other different configurations and types of transceiver components can be used in other embodiments for 10GBASE-T or for other, different communication standards. For explanatory purposes, the example shown in FIG. 4 illustrates a single transmitter path/channel and a single receiver path/channel for data. Multiple such paths/channels are provided in embodiments having multiple channels, e.g. four of the transmitter paths and the receiver data paths shown in FIG. 4 are used in the 10GBASE-T standard, one path for each channel; however, only one interference path (starting with line 195) is needed for the entire transceiver 150 although many such paths can also be used and combined in various forms in other embodiments.

One or more processors 151 are typically included in transceiver 150, or connected to the transceiver 150, to control various operations for the components of the transceiver; furthermore, additional hardware and/or software/firmware can be provided to implement the components themselves and can include processor functionality.

In the transmitter portion of the transceiver, an encoder 152 can be used to encode data desired to be transmitted in a particular desired format or standard, followed by a scrambler 154 for self-synchronized scrambling of the data to be transmitted, providing clock transitions, a statistically random power spectrum for EMI (electromagnetic interference) control, equalizer convergence, etc. A low density parity check (LDPC) encoder 156 encodes the data according to the parity check for error correction. A 128DSQ mapper 158 (or other type of mapper) then can use a coset-partitioned constellation to map the data to symbols, and each 128-DSQ symbol is transmitted using two back-to-back PAM-16 signals (Pulse Amplitude Modulation, 16 levels). A Tomlinson-Harashima Precoding (THP) precoder 160 can then adjust the signal to assist the far-end receiver in performing signal, equalization. An analog front end (AFE) for the transmitter can include a digital-to-analog converter (DAC) and driver block 162 which converts the data to analog form for transmission and transmits the data via the hybrid coupler and transformer block 164 to the channel 166.

Different embodiments can implement the hybrid and transformer block 164 differently. For example, in some embodiments the transformers may be separately connected directly to the communication link, and the hybrid coupler is connected between the transformers and the rest of the transceiver components. Other embodiments may provide transformers between hybrid and the other transceiver components, or another configuration.

In a receiver portion of the transceiver 150, data is received at the hybrid coupler and transformer block 164. Four data communication channels are used in a 10GBASE-T embodiment (other amounts of channels can be used in other embodiments), and are sent to an analog front end (AFE) for the receiver which can include a variable gain amplifier (VGA) and filter 170 for filtering, and an analog-to-digital converter (A/D) 172. An equalizer block 174 can include one or more equalizers to remove intersymbol interference (ISI). The output of the equalizer block 174 is summed with the outputs of filters 176 (described below) at adder 178, and the output of the adder can be provided to a slicer 180 which can provide an average noise level in the received signal. The signal can then be provided to a DSQ128 decoder 182, which outputs decoded data to a framer 184 that extracts frames from the received data and provides the frames to an LDPC decoder 186 which error-corrects the data. The data can then be provided to a de-scrambler 188 which outputs de-scrambled data to the encoder 152 for provision to a connected computer system, processor, or other device.

The filters 176 are used to reduce echo and crosstalk (NEXT and FEXT) noise which may be introduced in the transmission and reception of data over one or more of the four communication channels. Filters 176 can include an Echo canceller 190, a Near End Crosstalk (NEXT) canceller 192, and a Far End Crosstalk (FEXT) canceller 194. The filters 176 cancel out the effect of signal echo and crosstalk from adjacent lines to achieve an acceptable bit error rate. The output of the THP precoder 160 in the transmitter portion of the transceiver 150 is provided to the Echo canceller 190 and the NEXT canceller 192, which calculate the values for cancellation of echo and NEXT and output these values to the adder 78. Similarly, the output of ADC 172 is provided to the FEXT canceller 194, which calculates the values for cancellation of FEXT and outputs the values to the adder 178. The digital values of echo and crosstalk calculated by the filter are subtracted from the incoming noisy analog data (digitized by ADC 172) by adder 178 to provide received data on each channel with reduced noise.

The described embodiment of the present invention also includes an additional receiver path, an interference path, that is used for common mode noise detection, to allow the cancellation of alien interference. This path starts as a line 195 connected to the hybrid and transformer block 164 that provides a common mode signal. For example, the common mode signal can be obtained from one of the channel transformers as described above with respect to FIG. 3.

After being output from the hybrid and transformer block 164, the common mode signal on line 195 can be provided to an analog front end (AFE) that is dedicated to the common mode path, including a variable gain amplifier (VGA) and filter 196, and an analog to digital converter (ADC) 197. The output of the ADC 197 is provided to an alien interference cancellers block 106. For example, canceller block 106 can include adaptive filters 106 that receive the common mode noise signal as described above with reference to FIG. 2. The output of the alien interference cancellers block 106 is provided to associated adders, each adder on a different channel, and subtracts alien interference from the associated channel data signal provided on that receiver path. Thus, block 106 provides a canceling signal for each of the used receiver paths (only one of which is shown in FIG. 4). In the described example, the adder can be provided in the adder block 178, while in other embodiments it can be a dedicated adder separate from the block 178. For example, as shown in the embodiment of FIG. 2, each of the output cancellation signals of the adaptive filter block 106 is provided to a dedicated adder that also receives the corresponding data signal on the channel associated with that adaptive filter, and subtracts the noise associated with alien interference from the channel data signal.

As shown, the interference path used for alien interference cancellation may only require particular receiver components such as the analog front end components. Other receiver blocks are not needed, as shown in FIG. 4, and other components in the transmitter path (and used in the standard receiver paths) can also be omitted from the interference path, such as echo cancellers, NEXT cancellers, etc.

In other embodiments, the alien interference canceller 106 can output a cancellation signals to an adder provided at different locations in the sequence of receiver blocks, e.g. before the equalizers 174, after a later block such as slicer 180, decoder 182, etc.

The transceiver circuit exhibits certain signaling parameters that initially undergo a standard training sequence to achieve fully-functional nominal operation of data communication over a signaling link. The nominal operation is a predefined level of operation at which parameters are at a particular target level (such as bit error rate being under a particular target rate), and for which the transceiver can transmit and receive data over the link. The full training sequence is a predefined sequence of stages or steps known by the link partners, although the boundaries of the stages can be overlapped or blurred in some embodiments. The sequence typically occurs at a predefined point of operation, such as at startup when a transceiver is powered on or is first connected to a communication link. During nominal operation, after the full training sequence, the transceiver continues to adapt parameters (i.e. a continuous adaptation) to changing characteristics of the link based on received data. In one embodiment, more fully described in copending U.S. application Ser. No. 12/551,347, filed Aug. 31, 2009, entitled Fast Retraining For Transceivers In Communication Systems, and previously incorporated by reference herein, the training sequence may be shortened to reduce training time.

Creation of a Common Mode Noise Signal

In a different embodiment, the common mode noise signal used for canceling alien interference can be created based on a predetermined model and detected characteristics or parameters from the data signals received on the communication channels. In some implementations this embodiment may not provide as accurate an estimation of the alien interference, but since an additional communication channel is not needed to obtain the alien interference signal in this embodiment, it may be more practical for some communication system implementations.

In one embodiment, the common mode noise signal can be estimated by assuming a model for the common interferer and extracting the parameters of that model from the received signal on one or more of the channels receiving data. For example, in some applications the common mode noise can be assumed to be originating from a single-tone radio-frequency interferer (RFI). Such an interferer typically manifests an alien interference signal as a simple sine wave. Thus, the basic model of the common mode noise signal can be modeled and created as a sine wave. Parameters of the sine wave are also needed, such as amplitude, frequency, and phase. Amplitude and phase can be determined by adaptation using the adaptive filters 106 described above, e.g. the adaptive filters can act like a gain stage to adjust to the proper amplitude, as well as find the correct phase value. To determine the instantaneous frequency of the RFI, the frequency of the signals on some or all received channels can be examined, and the frequency common to the all the signals can be extracted or estimated. In addition, other receiver components can provide useful information, such as the slicer error provided by the slicer 80 for each channel, which can be additionally used to determine the frequency. This information is then used to create a sine-wave with the determined frequency, which is used as the alien interference signal, e.g. it is used as the input to the interfering canceller filters 106 as shown in FIG. 2.

Thus this embodiment determines a model based on the type of alien interference likely to be encountered. For example, the likely type(s) of alien interference can be determined with tests and/or training performed prior to actual operation. Then parameters of the specific alien interference currently being encountered can be extracted based on the current data signals being received on the communication channels, and/or determined by the filters 106. Such parameters can include signal frequency, phase, amplitude, etc.

This common mode signal creation embodiment has the advantage of not requiring an additional receiver path to implement, saving cost and implementation. For example, referring to the receiver in the transceiver 150 of FIG. 4, the common mode signal creation embodiment would not need to replicate the additional receiver path including the line and analog front end components 195, 196 and 197, and only needs to use the alien interference cancellers 106 which are provided the estimated alien interference signal from a processor or other controller in the receiver that estimates the signal, such as processor 151.

Figure 5:
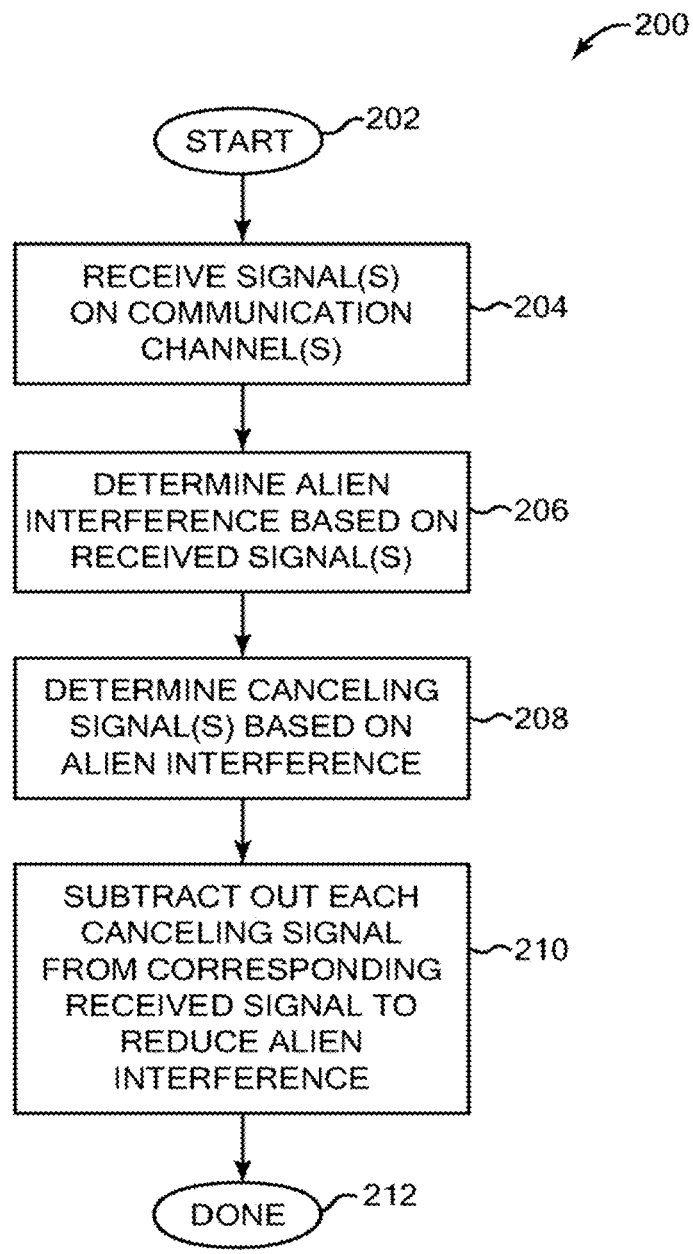
FIG. 5 is a flow diagram illustrating one embodiment of a method of the present invention for providing cancellation of alien interference for a receiver.

FIG. 5 is a flow diagram illustrating one embodiment of a method 200 of the present invention for providing cancellation of alien interference for a receiver. Method 200 can be implemented by one or more processors (such as processor(s) 151) provided in a transceiver or connected to a transceiver (such as in a connected computer system or electronic device), and can be implemented using hardware, software, or both hardware and software. The method can be implemented using a computer program product accessible from a computer readable medium providing program instructions or code for use by or implemented by a computer system or processor. A computer readable medium can be any apparatus that can contain, store, communicate, propagate, or transport the program for use by or in connection with the processor or computer system. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk (CD-ROM, DVD, etc.).

The method begins at 202, and in step 204, signal(s) are received by the transceiver on the communication channels. For example, in a 10GBASE-T system, data signals can be received on four data communication channels. In some embodiments, an additional interference channel may be used in order to determine the alien interference. In step 206, the method determines the alien interference, i.e., interference caused by a common interferer, based on one or more of the received signal(s). As described above, the alien interference can be determined differently in different embodiments. In some embodiments, a common mode noise signal (i.e. alien interference signal indicating the alien interference) can be directly obtained using an additional, interference receiver path, while in other embodiments the common mode noise signal can be estimated and created based on a model of the interference and obtained parameters from the data signals, as described above.

In step 208, the method determines canceling signals based on the alien interference. For example, as described above with reference to FIG. 2, the canceling signals can be provided by adaptive filters receiving an alien interference signal. In step 210, the canceling signals are subtracted from corresponding received data signals on data channels to cancel alien interference in the data signals. For example, as described above with reference to FIG. 2, each filter 106 provides a canceling signal to an associated adder 108 which also receives the corresponding data signal on the data channel 102, and the output of the adder outputs the resulting data signal having the alien interference subtracted out. The process is then complete at 212.

Examples of Test Results

Tests were performed to determine the effects of RF interference on a PHY (physical layer device) for Ethernet 10GBASE-T communications. In one test, a cable clamp was used to inject a sine-wave signal as interference over a 100 meter channel. Frequencies within a bandwidth of less than 400 MHz were used. The RFI was injected in one patch cord closer to the Master. The effect of RFI was seen on the LDPC iteration at about −0 dBm of signal-generator output power. The link failed when the power was increased to 0 dBm. The signal-generator could output a maximum power of 14.5 dBm.

According to the tests, if the link were established without RFI, it would fail with an injection of about 0 dBm of RFI. The signal-to-noise ratio (SNR) degrades significantly and adapting the filters only helped slightly, but not enough to keep the link operating. Speeding up the filter adaptation did not help significantly.

With an RFI present during the startup of the communication link, the link could be established with a good success rate even at the maximum RFI power. The THP precoder in the transmitter provided the resiliency to the RFI. The signal-to-noise ratio (SNR) did not degrade significantly. Turning off the RFI and turning it back on did not hurt the link. However, PHY architectures that have preset THP coefficients based on cable length would not be able to compensate for the RFI during training.

If an additional (e.g. fifth) receiver path is used to pick up the common mode RFI or alien crosstalk, the interference can potentially be cancelled without losing the link, even if the interference shows up after filter training. The additional receive path does not include echo cancellers or other transmitter cancellers and includes four additional finite impulse response filters (FIRS), similar to 1-EXT cancellers. These filters take common mode noise, such as RFI or alien crosstalk, and cancel it across all four main channels.

For example, with no RFI, the SNR in the test setup was ranged from 27 to 29 dB. In the presence of a 100 MHz RFI during startup, the FFE (feed forward equalizer) and DFE (decision feedback equalizer) converged to a very nice solution which blocked the RFI considerably but did not impact the SNR significantly, e.g., the SNR ranged from 27 to 28 dB. If the THP precoding is fixed and not adaptable, and is optimized for no RFI, the FFE by itself had a tough time balancing the RFI rejection with noise and inter-symbol interference (ISI) enhancement, e.g., the SNR ranged from 13 to 20 dB. If the far-end on one channel is turned off and that receiver path/channel is used as a reference to cancel the RFI on the other three channels (similarly as explained above with reference to FIGS. 2 and 3), then there was very good rejection with virtually no SNR penalty, e.g., the SNR ranged from 27 to 29 dB, using the second channel as the reference (which had 3 dB SNR).

The embodiments of the present invention provide significant advantages for canceling alien interference for transceivers on a communication network. The inventions described herein provide specific improvements intended to address the reduction of alien interference directly, for all configurations and implementations of a network. This allows less noise and more accurate reception of data at a receiver in a communication system.

Although the present invention has been described in accordance with the embodiments shown; one of ordinary skill in the art will readily recognize that there could be variations to the embodiments and those variations would be within the spirit and scope of the present invention. For example, other network standards can be used with the embodiments shown where similar requirements are applicable. Accordingly, many modifications may be made by one of ordinary skill in the art without departing from the spirit and scope of the appended claims.

What is claimed is:

1. A transceiver circuit comprising:
   a plurality of differential receivers to receive differential-mode signals from a corresponding plurality of twisted pair physical channels;
   a filter array;
   distribution circuitry to route a common-mode cancellation signal based on at least one common-mode signal detected from at least one of the physical channels to the filter array;
   wherein the filter array comprises a plurality of adaptive filters that correspond to the plurality of twisted pair physical channels, the plurality of adaptive filters having respective inputs to receive the distributed common-mode cancellation signal, each of the adaptive filters having an output to generate a digital value corresponding to the common-mode cancellation signal, wherein the digital value is applied to a summing node to cancel a digital conversion of the received common-mode signal.

2. The transceiver circuit according to claim 1 and further comprising:
   a common-mode receiver to receive the common-mode cancellation signal.

3. The transceiver circuit according to claim 1 and further comprising:
   common-mode detection circuitry to detect the at least one common-mode signal from one of the received differential-mode signals.

4. The transceiver circuit according to claim 1 wherein each adaptive filter converts the common-mode cancellation signal to a cancellation signal embodied as one of the plurality of RFI cancellation signals.

5. The transceiver circuit according to claim 4 wherein the adaptive filters perform a continuous adaptation.

6. The transceiver circuit according to claim 1 wherein the twisted pair physical channels comprise four unshielded twisted pairs of conductors.

7. The transceiver circuit according to claim 1 wherein the differential signals comprise signals transmitted in accordance with a 10GBASE-T ethernet protocol.

8. The transceiver circuit according to claim 1 and embodied as an integrated circuit chip.

9. A method of operation on a transceiver integrated circuit chip, the method comprising:
   receiving a plurality of Ethernet differential-mode signals from a plurality of twisted pair physical channels;
   detecting at least one common-mode signal from at least one of the physical channels;
   distributing a common-mode cancellation signal based on the detected common mode signal to generate a plurality of common-mode signals;
   adaptively filtering the plurality of common-mode signals to generate respective RFI cancellation signals, each RFI cancellation signal comprising a digital value corresponding to the common-mode cancellation signal; and
   attenuating RFI-induced interference by summing each RFI cancellation signal with a digital version of a corresponding differential-mode signal.

10. The method according to claim 9 wherein the adaptively filtering comprises continuously adaptively filtering the plurality of common-mode signals.

11. The method according to claim 9 wherein the detecting at least one common-mode signal occurs off-chip.

12. The method according to claim 9 wherein the detecting at least one common-mode signal occurs on-chip.

13. The method according to claim 9 wherein the processing with each of the differential-mode signals comprises:
   summing the RFI cancellation signals with the corresponding differential-mode signals.

14. A transceiver circuit comprising:
   receiver circuitry including a plurality of differential inputs to receive a plurality of differential-mode signals from a corresponding plurality of twisted pair physical channels;
   a filter array; and
   estimation circuitry to model a common-mode signal for input to the filter array;
   wherein the filter array comprises a plurality of adaptive filters that correspond to the plurality of twisted pair physical channels, the plurality of adaptive filters having respective inputs to receive the modeled common-mode signal, the adaptive filters having respective outputs to generate a plurality of RFI cancellation signals, each of the plurality of RFI cancellation signals comprising a digital value corresponding to the common-mode cancellation signal, each RFI cancellation signal for summing with a digital version of a corresponding received differential mode signal.

15. The transceiver circuit according to claim 14 wherein the estimation circuitry models the common-mode circuitry based on characteristics in the received differential-mode signals.

16. The transceiver circuit according to claim 15 wherein the characteristics comprise any from the group comprising amplitude, frequency, phase, and slicer error.

17. The transceiver circuit according to claim 1 wherein the at least one common-mode signal is detected from less than all of the plurality of physical channels.

18. The transceiver circuit according to claim 1 wherein the plurality of adaptive filters are finite impulse response (FIR) filters.

* * * * *